United States Patent Office 3,198,253
Patented Aug. 3, 1965

3,198,253
HYDRAULIC FRACTURING
Don R. Holbert, Tulsa, Okla., assignor, by mesne assignments, to Sinclair Research, Inc., New York, N.Y., a corporation of Delaware
No Drawing. Filed July 8, 1960, Ser. No. 41,476
19 Claims. (Cl. 166—33)

This invention concerns the hydraulic fracturing of subterranean oil-bearing formations to increase their permeability. More particularly, the invention relates to a method for hydraulically fracturing an oil-bearing formation and plugging a portion of the fracture or fractures without unduly decreasing the permeability at a level where withdrawal of oil or gas or introduction of a fluid is advantageous.

For some time it has been common practice to fracture oil-bearing formations to increase their permeability. One method of fracturing includes introduction of a liquid, usually substantially more viscous than water, into a well and exerting a pressure on the liquid to fracture or fissure the formation thereby increasing its permeability. Sand can be in the fracturing fluid to prop open the fractures created. In order to direct the fracturing pressure at the proper level of the well, i.e. at the oil-bearing formation, packers can be used to restrict contact of the fracturing fluid to the oil-bearing stratum. Frequently the well bore is cased and perforated at the level where fracturing is to be effected.

In any event, the hydraulic fracturing serves to increase the permeability of the oil-bearing formation and thereafter oil recovery should be greater due to improved access between the well bore and the producing formation. The fracturing process can also be used to increase the permeability of an oil-bearing formation for subsequent introduction of larger quantities of a driving fluid. For example, the formation opposite an input well, in an input-output well water flooding system, can be fractured to increase the amount of water injectable by way of the input well, thereby enhancing oil production from a co-operating or adjacent output well.

In many cases, hydraulic fracturing of oil-bearing formations has led to undesirable results. Frequently fracturing will increase oil recovery somewhat but a significant or even greater production of water will ensue. Needless to say, water production necessitating pumping and handling can be so expensive as to make operation of a given oil well uneconomical. Also, in a water input well hydraulic fracturing may lead to the situation where large quantities of water are taken into the formation with oil recovery being improved little, if any, at the output well. These unwanted effects occur even though the fluid used in hydraulically fracturing the wells is in contact only with the oil-bearing formation adjacent the producing or input well undergoing fracturing.

In the present invention I have found that undesirable water production or driving fluid acceptance in hydraulically fractured wells adjacent an oil-bearing formation can be significantly decreased through a method in which fracturing is followed by introduction into the oil-bearing formation of a plug-forming composition and subsequently a flushing liquid is added before the plug-forming composition is in plugging state. The amount of the sealing composition employed may be more or less than the fluid used to fracture the formation and even though the cementing operation might be considered as selective plugging, i.e. serving to curtail the passage of liquids through certain areas of the formation while not materially reducing flow in other areas, the method does not require intricate control or elaborate equipment to insure the sealing of primarily the undesired areas of the fractured oil-bearing formation.

In my method the relatively viscous fracturing liquid is introduced into the well bore to be treated and comes into contact with the oil-bearing formation, the operator usually being careful not to place the liquid adjacent a liquid-producing, non-oil-bearing formation. An example of the latter would be a water-containing stratum under the oil-bearing area where fracturing at the water level would lead to excessive water production in a producing well or undue permeability to and acceptance of water in the case of a water input well. Pressure is then exerted on the fracturing liquid from the earth's surface to create fissures and increase permeability to liquids. Generally the pressure needed to fracture the formation is about 0.3 to 2 pounds for each foot of depth of the oil-bearing strata from the earth's surface.

The fracturing fluid employed in my invention can be any of the various compositions used in the art. These fluids are in general liquids having a viscosity substantially greater than that of water and may contain reversible thickeners and formation propping agents such as sand. A suitable fracturing fluid is a mixture of green oil, i.e. a refined petroleum oil having an API gravity of 20.3° at 60° F., and sand, conveniently one pound per gallon, and it is advantageous if the fluid has a viscosity of about 25 to 90 centipoises.

After fracturing, at least about 25%, preferably about 40 to 90%, by volume based on the amount of fracturing liquid employed, of the plug-forming composition is injected into the oil-bearing formation. The sealing composition volume may be as great or greater than the fracture liquid volume but usually not more than about double the amount, i.e. about 200%. In this operation the cementing composition has a specific gravity greater than that of oil and no care need be taken to contact only a selected part of the oil-bearing formation exposed to the fracturing fluid. Usually in the method the cementing composition will have access to essentially the entire well bore wall subjected to the fracturing fluid. The amounts of fracturing fluid and cementing compositions employed are taken as the portion actually introduced into the formation.

Following injection of the sealing composition and before it has set to a state in which it is essentially immovable at pressures that do not materially cause further fracturing of the formation, I introduce into the oil-bearing formation a flushing fluid, for example lease crude, water or other liquid having a specific gravity substantially less than the sealing composition and brine. The flushing fluid may also be introduced across essentially the entire vertical face of the oil-bearing stratum subjected to fracturing. Frequently the specific gravity of the flushing fluid will be less than about 1 and preferably not greater than about 0.8. Generally, the flushing fluid injected into the formation will be about 10 to 75%, advantageously not greater than about 50%, of the volume of fracturing fluid introduced into the formation. The flushing fluid is preferably not miscible with the sealing composition. Thus with a water-based sealing composition a non-water miscible flushing liquid seems the best choice. The flushing liquid contains essentially no solid or solid-forming components which would plug the formation.

After the flushing fluid is injected the sealing composition is allowed to set, or transform essentially into a solid and exert a plugging action. This can be done through stopping flow into or from the well by closing it at the earth's surface, i.e. shut it in. Subsequently the well can be used for oil production or water injection as the case may be in which operations the liquid will move through the open fractured areas either towards or away from the well with there being significantly less unwanted water intake in the case of an input well or water production in case of an oil recovery well.

The plug-forming or sealing composition of my invention can be an organic or inorganic material which is pumpable into the oil-bearing formation where it will harden or set to a more or less solid form under conditions prevailing in the well bore, where temperatures are usually in the range of about 50 to 200° F., to form with the underground stratum a barrier to the passage of liquids. As stated, the composition is of specific gravity substantially greater than that of the in-situ petroleum oil for instance a specific gravity of above about 1, yet the viscosity of the composition should not be too great as to unduly hinder its passage into the oil-bearing formation. The viscosity of the sealing material will usually be within the range of about 1 to 15 centipoises at the time of introduction into the oil-bearing stratum. I find it advantageous to inject the sealing composition in batches. When the latter segments of the composition are being introduced the initial portions placed in the formation have transformed into a more viscous state. As a result, a squeezing effect is exerted on the intermediate portions of the sealing composition and this action will continue during the addition of the flushing fluid, thus producing more effective plugging.

One sealing composition useful in my invention is a weighted liquid resin-forming material and more particularly is an aqueous solution of an alkylidene bisacrylamide, an ethylenic monomer and a weighting agent such as calcium chloride. The bisacrylamide has the formula:

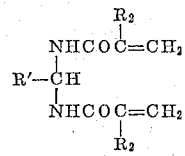

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e., contains at least the $>C=C<$ radical) compound with a solubility of at least about 2 percent by weight, and preferably at least about 5 percent, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, acrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents. Only slight solubility is required of the alkylidene bisacrylamide in view of the small amount used; therefore, this component may have a water solubility as low as about 0.02 percent by weight at 20° C. but a solubility of at least about 0.10 percent is more desirable for general purposes.

A wide variety of ethylenic comonomers or mixtures thereof are copolymerizable with the alkylidene bisacrylamides; those having a formula containing at least one $>C=C<$ group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent, the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

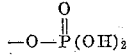

—OOCH; —OOCH$_3$; —SO$_3$X, where X is H, NH$_4$, an alkali metal or an alkylamine; —CONR$_2$ and

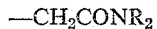

where each R is hydrogen, alkylol, lower alkyl or a polyoxyalkylene radical; and —COOR' and —CH$_2$COOR', where R' is a H, NH$_4$, alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkly chain increases and aryl groups tend to decrease water solubility whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrlyamide, calcium acrylate, methacrylamide and acrylamide. Other suitable ethenoid compounds are acrylic acid; other N-substituted acrylamides, such as N-methylacrylamide, N-3-hydroxypropylacrylamide, dimethylamino-propylacrylamide, N-ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethylacrylate or acrylic acid with about 1 to about 50 moles or more of ethylene oxide; salts of acrylic acid, i.e., magnesium acrylate, sodium acrylate, ammonium acrylate, zinc acrylate, β-amino-ethylacrylate, β-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacronlein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxyethyl methacrylate, zinc β-chloroacrylate, trimethylamine methacrylate, calcium β-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N'-dimethyl-β-aminoethyl) maleate, sulfonated styrene, vinyl pyridine, maleic anhydride, sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methyl-acetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinium chloride, and allyl trimethyl ammonium chloride to name only a few of the operative compounds.

The preferred resin-forming or plugging composition of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylenebisacrylamide and about 99 to 75 weight percent of acrylamide. The aqueous solution will usually include from about 5 weight percent of this mixture to its limit of solubility and preferably this amount is about 5 to 25 percent while the $CaCl_2$ will generally comprise from about 15 to 35 weight percent and preferably from about 25 to 30 weight percent. Although the acrylamide as such is preferred, its nitrogen atom could be substituted as with a hydroxy methyl or a hydroxy ethyl group.

In addition to the above-mentioned ingredients, the compositions may include other components, for instance, compounds exhibiting catalytic activity or other weighting agents may be added. Components exhibiting catalytic activity can be added prior to injection of the compositions in the well bore. Care must be exercised as to the amount of catalytic material added and this will depend upon the specific component employed, however, this amount should be such that sufficient working time is provided to permit displacement of the composition into the permeable area to be plugged before it hardens into the solid or semi-solid state. In general, the working life of the material at the temperatures and pressures encountered in the bore hole is such that it has a viscosity of up to about 10 to 15 centipoises, advantageously about 1 to 5 centipoises, at these conditions for at least about 15 minutes, and preferably for at least about 30 minutes. When referring to "working life" I mean the time which elapses after all essential ingredients for the formation of the solid or semi-solid plugging resin or plastic under the conditions of temperature and pressure found in the area of the well bore to be plugged have been added, for instance monomer, catalyst and promoter, e.g. a redox catalyst system, etc. A redox catalyst system generally includes an oxidizing agent, i.e. the catalyst, and reducing agent, i.e. promoter. The oxidizing component of the redox catalyst system can include for instance, any of the usual water-soluble peroxy catalysts derived from peracids such as persulfuric, perchloric, perboric, and permanganic and their salts. For example, ammonium, potassium and sodium persulfates, hydrogen peroxide, the alkali metal and ammonium perchlorates, and the like may be employed. Among the reducing components that can be employed are the oxygen-containing sulfur compounds such as the alkali metal, e.g. sodium or potassium, bisulfites, and nitrilo-trispropionamide. Examples of typical oxidizing agent-reducing agent combinations are sodium persulfate, potassium persulfate or ammonium persulfate-nitrilo-tris-propionamide. Ammonium per-sulfate is an acceptable oxidation agent or catalyst to polymerize the aqueous mixture and it can be employed with a promoter or reducing agent such as sodium thiosulfate or nitrilo-tris-propionamide. The amounts of each of the catalyst and promoter usually are about 0.1 to 2 weight percent based on the aqueous solution of resin-forming material, and these amounts can be varied to give the desired working life. For instance, a weight ratio of catalyst to promoter of 1 to 2 in an aqueous solution containing 20 weight percent of the acrylamide and N,N'-methylenebisacrylamide (95 percent acrylamide and 5 percent N,N'-methylenebisacrylamide) will give a working life at 70° F. of about 60 to 120 minutes when the catalyst plus promoter is about 0.5 to 1.5 percent of the aqueous solution.

The weighted composition is heavier than salt water which has a specific gravity greater than 1, generally about 1.05 to 1.2. The weighted resin-forming materials of the present invention have advantageous specific gravities, e.g. greater than about 1.2, preferably greater than about 1.25. The specific gravity of the resin-forming material can be adjusted by the addition of varying amounts of calcium chloride. Suitable weighting agents which can be used in combination with calcium chloride include water-soluble, non-ionizing organic compounds, e.g. sugar and glycerol.

My method will be described with reference to the following specific example which is not to be taken as limiting.

The well is a pumping producing well located in Osage County, Oklahoma, and having an oil-bearing sand beginning at about 2710 feet below the surface of the earth. The well is about 2759 feet deep and is cased with 5½ inch casing cemented in place. The casing is perforated by fifty-six ½ inch holes between the depths of 2712 feet and 2726 feet which is the location of the oil-bearing sand; the water table is at approximately 2740 feet. A mixture of 2000 gallons of green oil and 2000 lbs. sand is injected into the well and the pressure on the mixture is increased to 1500 p.s.i. with fracturing reducing the pressure to 1350 p.s.i. After fracturing the well is shut in at about 200 p.s.i. Subsequent production from the well is at the rate of 7 barrels of oil per day and 463 barrels of water per day. A string of 2½ inch tubing is run from the earth's surface to about 2705 feet and the packer is set at this level between the tubing and the casing. 1000 gallons of a resin-forming solution having a specific gravity of 1.27 and the following composition is introduced into the well whose bottom hole temperature is 125° F:

| Component: | Weight Percent |
|---|---|
| Acrylamide | 9.5 |
| N,N'-methyl-bisacrylamide | .5 |
| Ammonium persulfate | .01 |
| Nitrilo-tris-propionamide | .02 |
| Water containing 30% $CaCl_2$ | Balance |

The resin-forming solution is introduced into the well over a period of about 20 minutes and subsequently 500 gallons of lease petroleum crude oil having a specific gravity of 0.7 is charged to the well over a period of 20 minutes. The well is then shut in for 18 hours to permit the resin-forming solution to set. The 2½ inch tubing string bearing the packer is withdrawn from the well and pumping equipment inserted. The well is then produced by pumping and has a significantly improved oil-to-water recovery ratio with little if any decrease in oil production rate.

I claim:

1. In a method for increasing the permeability of an oil-bearing formation, the steps comprising placing a fracturing liquid in contact with the oil-bearing formation, exerting a pressure on the liquid to fracture hydraulically the oil-bearing formation, introducing into the fractured formation an aqueous plug-forming composition having a viscosity of about 1 to 15 centipoises and a specific gravity greater than the in-situ oil and in an amount of at least about 25% of the volume of the fracturing liquid, introducing a flushing liquid into the fractured formation prior to the plug-forming composition being transformed into the plugging state, said flushing liquid having a specific gravity less than formation brine and less than the plug-forming composition and constituting about 10 to 75% of the volume of the fracturing liquid and allowing the plug-forming composition to transform into an essentially solid, formation-plugging state.

2. The method of claim 1 in which the well is an oil-producing well which is produced after the plug-forming composition has been transformed.

3. In a method for increasing the permeability of an oil-bearing formation, the steps comprising placing a viscous fracturing liquid in contact with the oil-bearing formation, exerting a pressure on the liquid to fracture hydraulically the oil-bearing formation, introducing into the fractured formation an aqueous plug-forming solution of a weighted, liquid, resin-forming material having a viscosity of about 1 to 15 centipoises and a specific gravity greater than about 1 and in an amount of about 25 to 200% of the volume of the fracturing liquid, introducing a flushing liquid into the fractured formation prior to the plug-forming solution being transformed into the plugging state, said flushing liquid having a specific gravity less than about 1 and constituting about 10 to 75% of the volume of the fracturing liquid, and allowing the plug-forming solution to transform into an essentially solid, formation-plugging state.

4. The method of claim 3 in which the flushing liquid is non-water miscible.

5. The method of claim 4 in which the amount of plug-forming solution is about 40 to 90% of the fracturing liquid.

6. The method of claim 4 in which the well is an oil-producing well which is produced after the plug-forming solution has been transformed.

7. The method of claim 5 in which the amount of flushing liquid is about 10 to 50% of the volume of the fracturing liquid.

8. The method of claim 1 in which the plug-forming composition is a resin-forming solution consisting essentially of water and a mixture consisting essentially of (a) about 1 to 25 weight percent of a monomeric alkylidene bisacrylamine of the formula

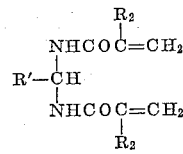

in which

is a hydrocarbon residue of an aldehyde containing from about 1 to 10 carbon atoms and $R_2$ is of the group consisting of hydrogen and methyl and (b) about 75 to 99 weight percent of another ethylenic monomer copolymerizable with (a).

9. The method of claim 8 in which the flushing liquid is non-miscible with water.

10. The method of claim 9 in which said aqueous resin-forming solution includes about 15 to 35 weight percent of calcium chloride.

11. The method of claim 10 in which the well is an oil-producing well which is produced after the resin-forming solution has been transformed.

12. The method of claim 8 in which the resin-forming solution consists essentially of water and about 5 to 25% of a mixture consisting essentially of (a) about 1 to 25 weight percent of N,N'-methyl-bisacrylamide and (b) about 75 to 99 weight percent of acrylamide.

13. The method of claim 12 in which the flushing liquid is non-miscible with water.

14. The method of claim 13 in which the resin-forming solution includes about 15 to 35 weight percent of calcium chloride.

15. The method of claim 14 in which the well is an oil-producing well which is produced after the resin-forming solution has been transformed.

16. The method of claim 1 in which the flushing liquid is non-miscible with the plug-forming composition.

17. The method of claim 1 in which the oil-bearing formation is underlain by a water-bearing formation and there is undesirable water production or water acceptance after fracturing.

18. The method of claim 3 in which the oil-bearing formation is underlain by a water-bearing formation and there is undesirable water production or water acceptance after fracturing.

19. The method of claim 13 in which the oil-bearing formation is underlain by a water-bearing formation and there is undesirable water production or water acceptance after fracturing.

References Cited by the Examiner

UNITED STATES PATENTS

| | | | |
|---|---|---|---|
| 2,782,857 | 2/57 | Clark et al. | 166—42 |
| 2,792,893 | 5/57 | Keller | 166—33 |
| 2,801,985 | 8/57 | Roth | 166—42 |
| 2,827,121 | 3/58 | Nowak | 166—42 |
| 2,842,206 | 7/58 | Bearden et al. | 166—33 |
| 2,856,380 | 10/58 | Roth et al. | 252—8.5 |
| 3,044,550 | 7/62 | Eilers | 166—42.1 |

CHARLES E. O'CONNELL, *Primary Examiner.*

NORMAN YUDKOFF, *Examiner.*